US009254631B2

United States Patent
Akasaka et al.

(10) Patent No.: US 9,254,631 B2
(45) Date of Patent: Feb. 9, 2016

(54) LAMINATION APPARATUS

(75) Inventors: Shin Akasaka, Kanagawa (JP); Satoshi Kumon, Tokyo (JP)

(73) Assignee: SONY CORPORATION, Tokyo (JP)

( * ) Notice: Subject to any disclaimer, the term of this patent is extended or adjusted under 35 U.S.C. 154(b) by 898 days.

(21) Appl. No.: 13/434,464

(22) Filed: Mar. 29, 2012

(65) Prior Publication Data

US 2012/0273137 A1 Nov. 1, 2012

(30) Foreign Application Priority Data

Apr. 28, 2011 (JP) .................. 2011-101410

(51) Int. Cl.
| | | |
|---|---|---|
| B32B 37/00 | (2006.01) | |
| B32B 37/10 | (2006.01) | |
| B32B 17/06 | (2006.01) | |
| B32B 37/12 | (2006.01) | |
| B32B 38/00 | (2006.01) | |
| B32B 38/16 | (2006.01) | |

(52) U.S. Cl.
CPC ........... *B32B 37/1036* (2013.01); *B32B 17/064* (2013.01); *B32B 37/025* (2013.01); *B32B 37/1284* (2013.01); *B32B 38/0004* (2013.01); *B32B 38/0036* (2013.01); *B32B 2038/168* (2013.01); *B32B 2309/04* (2013.01); *B32B 2310/0843* (2013.01); *B32B 2315/08* (2013.01); *B32B 2457/202* (2013.01); *Y10T 156/1339* (2015.01)

(58) Field of Classification Search
CPC .. B32B 37/025; B32B 37/1036; B32B 17/064
USPC ......... 156/499, 510, 521, 555, 575, 580, 582, 156/583.1, 257
See application file for complete search history.

(56) References Cited

U.S. PATENT DOCUMENTS

| | | | | |
|---|---|---|---|---|
| 4,585,509 A | * | 4/1986 | Obayashi | 156/497 |
| 6,451,154 B1 | * | 9/2002 | Grabau et al. | 156/300 |
| 6,684,925 B2 | * | 2/2004 | Nagate et al. | 156/540 |

FOREIGN PATENT DOCUMENTS

| | | |
|---|---|---|
| JP | 2006-237542 | 9/2006 |
| JP | 2007-251080 | 9/2007 |
| JP | 2009-246090 | 10/2009 |

* cited by examiner

*Primary Examiner* — James Sells
(74) *Attorney, Agent, or Firm* — Hazuki International, LLC

(57) ABSTRACT

Disclosed herein is a lamination apparatus including: a mechanism configured to transport a belt-like flexible substrate including a transfer layer and a supporting layer layered on each other; a mechanism configured to transport a sheet-like rigid substrate; a mechanism configured to coat adhesive to the transfer layer while transporting the belt-like flexible substrate; a mechanism configured to cut the transfer layer having the adhesive coated thereon into a sheet while transporting the belt-like flexible substrate; and a mechanism configured to laminate the transfer layer cut out into the sheet to the rigid substrate through the adhesive while transporting the belt-like flexible substrate and the sheet-like rigid substrate.

4 Claims, 4 Drawing Sheets

LAMINATION APPARATUS

CROSS REFERENCES TO RELATED APPLICATIONS

The present application claims priority to Japanese Priority Patent Application JP 2011-101410 filed in the Japan Patent Office on Apr. 28, 2011, the entire content of which is hereby incorporated by reference.

BACKGROUND

The present application relates to a lamination apparatus for laminating a flexible substrate to a rigid substrate through adhesive.

In recent years, various electronic apparatus represented by a display apparatus have been developed. Such electronic apparatus include a circuit board on which thin film transistors (TFTs) for driving and like circuit devices are mounted in order to implement various functions such as a displaying function.

As a supporting substrate of a circuit board, a rigid substrate such as a glass plate is used widely. However, in order to implement a flexible electronic apparatus, it is investigated to use a flexible substrate such as a plastic film. In this instance, since it is necessary to form circuit devices such as TFTs on the surface of the flexible substrate, it is necessary to secure the flexible substrate against deformation such as deflection or strain.

In order to support a flexible substrate using a rigid substrate, it has been proposed to laminate the flexible substrate to the rigid substrate through adhesive as disclosed, for example, in Japanese Patent Laid-Open No. 2006-237542, 2007-251080 or 2009-246090. Also an apparatus for such lamination has been proposed and is disclosed, for example, in www.mck-web.co.jp/companyprofile/history/index.html.

SUMMARY

Since adhesive is used to laminate a flexible substrate to a rigid substrate in the past, long time is required and the working efficiency is not sufficiently high. Besides, if excessive time is taken for the lamination, then the performance of the adhesive is deteriorated by moisture absorption and so forth, and consequently, the flexible substrate after the lamination becomes liable to be exfoliated from the rigid substrate.

Therefore, it is desirable to provide a lamination apparatus which can laminate a flexible substrate to a rigid substrate efficiently in short time through adhesive.

According to an embodiment disclosed herein, there is provided a lamination apparatus including a mechanism configured to transport a belt-like flexible substrate including a transfer layer and a supporting layer layered on each other, a mechanism configured to transport a sheet-like rigid substrate, a mechanism configured to coat adhesive to the transfer layer while transporting the belt-like flexible substrate, a mechanism configured to cut the transfer layer having the adhesive coated thereon into a sheet while transporting the belt-like flexible substrate, and a mechanism configured to laminate the transfer layer cut out into the sheet to the rigid substrate through the adhesive while transporting the belt-like flexible substrate and the sheet-like rigid substrate.

With the lamination apparatus according to an embodiment of the present technique, while a belt-like flexible substrate including a supporting layer and a transfer layer and a sheet-like rigid substrate are transported, adhesive is coated on the transfer layer, and then the transfer layer is cut out into a sheet. Then, the cut out transfer layer is laminated to the rigid substrate. Therefore, the flexible substrate can be laminated to the rigid substrate efficiently in short time through the adhesive.

The above and other features and advantages of the disclosed technology will become apparent from the following description and the appended claims, taken in conjunction with the accompanying drawings in which like parts or elements denoted by like reference symbols.

Additional features and advantages are described herein, and will be apparent from the following Detailed Description and the figures.

DETAILED DESCRIPTION

In the following, an embodiment of is described in detail with reference to the accompanying drawings. It is to be noted that the description is given in the following order.

1. Configuration the Lamination Apparatus
2. Operation of the Lamination Apparatus <1. Configuration of the Lamination Apparatus>

Figure 1:
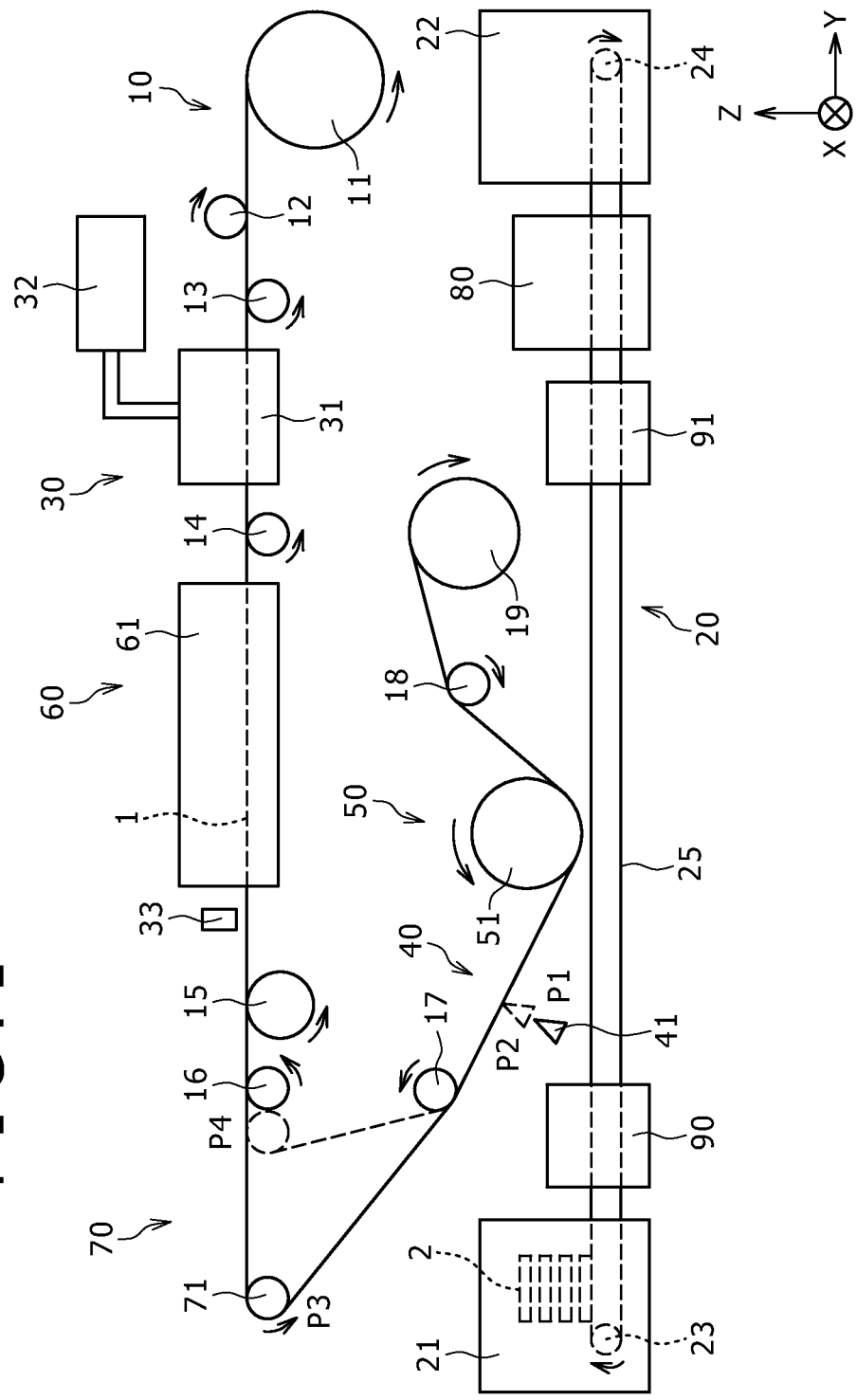
FIGS. 1 and 2 are views schematically showing a configuration of a lamination apparatus according to an embodiment disclosed herein.
Figure 2:
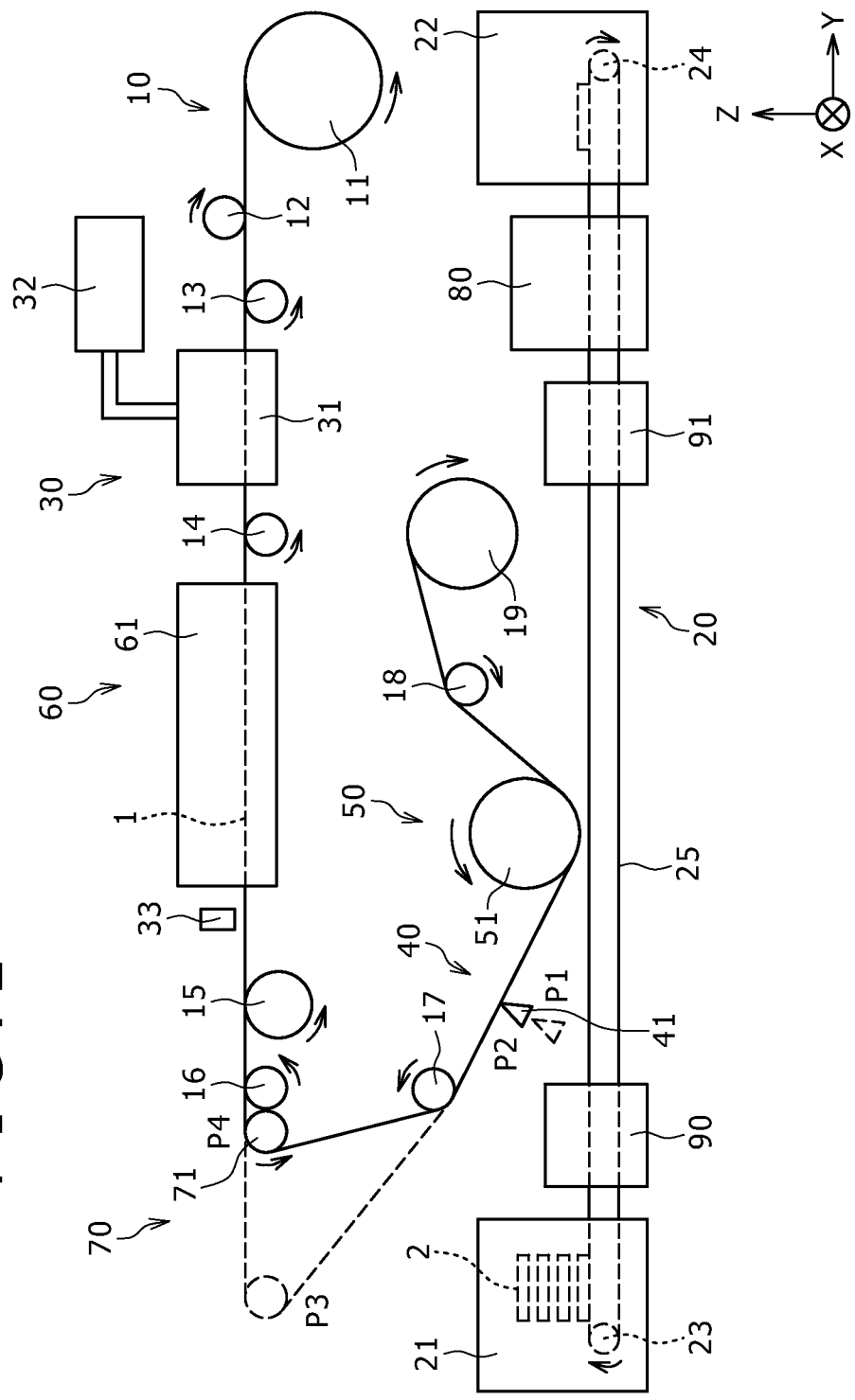
Figure 3:
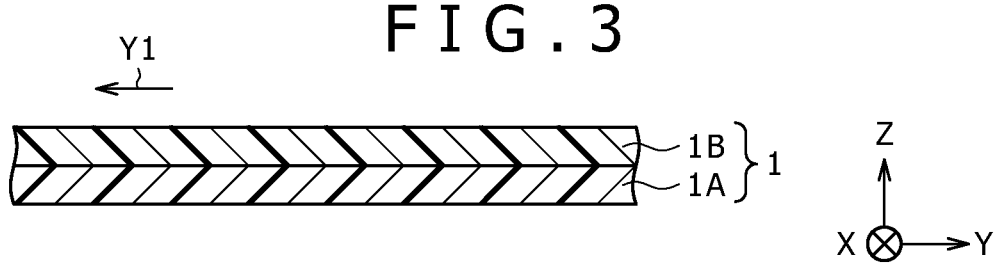
FIG. 3 is a schematic sectional view showing a configuration of a flexible substrate.

First, a configuration of a lamination apparatus according to an embodiment is described. FIGS. 1 and 2 schematically show a configuration of the lamination apparatus, and FIG. 3 shows a cross sectional configuration of a flexible substrate 1 which is introduced into the lamination apparatus. It is to be noted that, in FIGS. 1 and 2, the flexible substrate 1 is shown in a state in which it is transported in order to facilitate recognition of a transport path for the flexible substrate 1.

The lamination apparatus of an embodiment is used to laminate the flexible substrate 1 to a rigid substrate 2 through adhesive. Although the application of the flexible substrate 1 laminated to the rigid substrate 2 is not restricted particularly, for example, the flexible substrate 1 is applied to a supporting substrate of a circuit board applied to electronic apparatus for various applications. Such electronic apparatus may be display apparatus such as liquid crystal display apparatus, organic electroluminescence (EL) display apparatus and electronic paper display apparatus or may be apparatus for any other application than for the display application.

Referring to FIGS. 1 and 2, the lamination apparatus includes transport mechanisms 10 and 20, a coating mechanism 30, a cutting mechanism 40 and a lamination mechanism 50. The coating mechanism 30, cutting mechanism 40 and lamination mechanism 50 are disposed along a transport path for the flexible substrate 1. Further, the lamination apparatus may additionally include, for example, a drying mechanism 60, a buffer mechanism 70, a heating mechanism 80 and cleaning mechanisms 90 and 91.

Referring to FIG. 3, the flexible substrate 1 includes a supporting layer or protective layer 1A and a transfer layer 1B layered with each other and has a belt-like form. The "belt-like" signifies a state that, since the flexible substrate 1 has a length sufficiently greater than a width, it extends in the lengthwise direction and can be wound into a roll. The supporting layer 1A peelably supports the transfer layer 1B, and the transfer layer 1B is adapted to be peeled from the supporting layer 1A and laminated to the rigid substrate 2. However, the flexible substrate 1 may include some other layer together with the supporting layer 1A and the transfer layer 1B as occasion demands.

Although the supporting layer 1A and the transfer layer 1B are not restricted particularly only if they have flexibility, they may be formed, for example, from a plastic film. The material of the plastic film may be, for example, polyethylene terephthalate, polyethylene naphthalate, polyether sulfone, polyetherimide, polyether ether ketone, polyphenylene sulfide, polyarylate, polyimide, polyamide, polycarbonate, cellulose triacetate, polyolefin, polystyrene, polyethylene, polypropylene, polymethylmethacrylate, polyvinyl chloride, polyvinylidene chloride, an epoxy resin, a phenol resin, a urea resin, a melamine resin, a silicone resin or an acrylic resin. It is to be noted, however, that the supporting layer 1A and the transfer layer 1B may be formed from the same material or from different materials from each other.

The rigid substrate 2 has a sheet-like form. The term "rigid" is used herein to signify a nature that the rigid substrate 2 can support the transfer layer 1B, which is laminated thereto, stably such that the transfer layer 1B may not be deformed. Further, the term "sheet-like" is used herein to signify that, different from the bell-like flexible substrate 1 extending in the lengthwise direction, the rigid substrate 2 has a form of a plurality of flat plates separated from each other. Although the rigid substrate 2 is not restricted particularly only if it has rigidity, it may be, for example, a quarts plate or a glass substrate such as a heat-resistant glass. In addition, the rigid substrate 2 may be, for example, a metal plate or a ceramic plate. It is to be noted that configuration conditions of the rigid substrate 2 are preferably determined taking not only the rigidity described above but also a temperature condition, handling properties and so forth at a succeeding step to which the rigid substrate 2 is introduced after the lamination into consideration. Such configuration conditions of the rigid substrate 2 are, for example, a melting point=approximately 500° C. or more, a linear expansion coefficient=10 ppm or lower and a thickness=0.4 mm or more. The "succeeding step" is a step at which a circuit device such as a TFT is formed on the transfer layer 1B.

The transport mechanism 10 is a mechanism for transporting the belt-like flexible substrate 1 and includes a delivery roll 11, a cleaning roll 12, feed rolls 13 to 18, and a take-up roll 19. The rolls are rotatable around respective axes at the centers thereof, that is, around axes extending along the X axis illustrated in FIGS. 1 and 2. An arrow mark applied to each of the rolls in FIGS. 1 and 2 represents the direction of rotation of the roll. The transport mechanism 10 transports the flexible substrate 1 such that, for example, the transfer layer 1B of the flexible substrate 1 provides an outer face of the flexible substrate 1.

The delivery roll 11 has the flexible substrate 1 before lamination wound in the form of a roll thereon, and the take-up roll 19 has the flexible substrate 1 after lamination wound in the form of a roll. The delivery speed and the take-up speed of the flexible substrate 1 can be adjusted for the individual rolls. The feed rolls 13 to 18 guide the flexible substrate 1 supplied thereto from the delivery roll 11 to the take-up roll 19 through the mechanisms described above. The cleaning roll 12 is disposed, for example, in front of the coating mechanism 30 and cleans the surface of the transfer layer 1B to which adhesive is to be coated by the coating mechanism 30. However, the cleaning roll 12 may be replaced by ultrasonic cleaning or the like. It is to be noted that the feed roll 15 is a speed adjustment roll, the speed of rotation of which can be adjusted in order to implement, for example, a function of the buffer mechanism 70 hereinafter described.

The transport mechanism 20 is a mechanism for transporting the sheet-like rigid substrate 2 along a path different from that of the transport mechanism 10 and includes a preparation room 21 and a recovery room 22, and a movable member 25 supported at the opposite ends thereof by feed rolls 23 and 24. The rolls mentioned are rotatable around respective axes at the centers thereof, that is, around axes extending along the X axis. Again, an arrow mark applied to each roll in FIGS. 1 and 2 represents the direction of rotation of the roll.

The preparation room 21 is a room in which the rigid substrate 2 before lamination is to be stockpiled, and, for example, a plurality of rigid substrates 2 are accommodated in the preparation room 21. The plural rigid substrates 2 are successively transported by the transport mechanism 20. In FIG. 2, it is shown that some rigid substrate 2 is transported from the preparation room 21 to the recovery room 22. The recovery room 22 is positioned on the opposite side to the preparation room 21 with the lamination mechanism 50 interposed therebetween and accommodates the rigid substrate 2 after lamination. The feed rolls 23 and 24 are disposed separately, for example, in the preparation room 21 and the recovery room 22, respectively. The movable member 25 extends between and is wrapped around the feed rolls 23 and 24 such that they serve as rotational supporting axes thereof, and is slidably moved in response to rotation of the feed rolls 23 and 24. The feed rolls 23 and 24 and the movable member 25 may be, for example, a belt conveyor. It is to be noted that the rigid substrate 2 after lamination can be carried out from the recovery room 22 as occasion demands.

The coating mechanism 30 is a mechanism for coating adhesive to the transfer layer 1B while it transports the belt-like flexible substrate 1, and includes a coating apparatus 31, an adhesive supplying apparatus 32 and a film thickness inspection instrument 33. The coating mechanism 30 except the film thickness inspection instrument 33 is disposed, for example, between the delivery roll 11 and the drying mechanism 60 along the transport path for the flexible substrate 1.

The coating apparatus 31 coats adhesive, particularly adhesive solution, supplied thereto from the adhesive supplying apparatus 32 on the surface of the transfer layer 1B. Although the coating method is not restricted particularly, it may be, for example, die coating, gravure coating, knife coating, lip coating, slit coating or spray coating. The adhesive supplying apparatus 32 includes an automatic agitating apparatus for mixing and agitating organic solvent together with base resin which is a construction material of the adhesive and curing agent, a pump for supplying the adhesive from the automatic agitating apparatus to the coating apparatus 31, and so forth. Preferably, the automatic agitating apparatus can adjust the supplying amount of the adhesive. The film thickness inspection instrument 33 measures the film thickness of the adhesive coated by the coating apparatus 31 and is, for example, a film thickness gage of the infrared type. Although the position of the film thickness inspection instrument 33 is not restricted particularly, the film thickness inspection instrument 33 is positioned, for example, between the drying mechanism 60 and the buffer mechanism 70 along the transport path for the flexible substrate 1 in order to measure the film thickness of the adhesive after dried. It is to be noted that the coating apparatus 31 may be configured such that it can adjust the coating amount of the adhesive in response to the film thickness measured by the film thickness inspection instrument 33.

Although the type of the adhesive is not restricted particularly, for example, an acrylic-based adhesive, a silicone-based adhesive, a siloxane-based adhesive or a natural rubber-based adhesive may be used. Particularly, an adhesive having a sufficient heat resisting property in a temperature condition at a succeeding step to which the transfer layer 1B laminated to the rigid substrate 2 is introduced is used preferably. More particularly, an adhesive whose thermogravimetric decrease at a peak temperature is preferably lower than approximately 1%, and more preferably lower than approximately 0.1%. The "temperature condition at a succeeding step" is, for example, a formation temperature of a circuit device such as a TFT.

The cutting mechanism 40 is a mechanism for cutting the transfer layer 1B to which the adhesive is coated into sheets while transporting the belt-like flexible substrate 1 and includes a cutter 41. The cutting mechanism 40 is disposed, for example, between the buffer mechanism 70 and the lamination mechanism 50 along the transport path for the flexible substrate 1.

The cutter 41 includes a single blade or a pull blade and is movable between a position P1 retracted from the transport path for the flexible substrate 1 and a position P2 at which the cutter 41 can cut the transfer layer 1B. It is to be noted, however, that the cutter 41 may be of the type which can carry out remote cutting such as a laser cutting apparatus. In any case, the cutter 41 can cut only the transfer layer 1B without cutting the supporting layer 1A while it transports the flexible substrate 1. It is to be noted that the cutting place or range of the transfer layer 1B is arbitrarily determined only if it can cut the transfer layer 1B into a sheet and may be a full width region or a desired region of a width smaller than the full width.

The lamination mechanism 50 is a mechanism for laminating the transfer layer 1B cut into a sheet to the rigid substrate 2 through the adhesive while it transports the belt-like flexible substrate 1 and the sheet-like rigid substrate 2, and includes a laminating roll 51. The lamination mechanism 50 is disposed, for example, between the cutting mechanism 40 and the take-up roll 19 along the transport path for the flexible substrate 1, and the disposition place of the laminating roll 51 is a place which overlaps with part of the transport path for the rigid substrate 2.

The drying mechanism 60 is a mechanism for heating the adhesive coated to the transfer layer 1B to dry the same and includes a drying hood 61. The drying mechanism 60 is disposed, for example, between the coating mechanism 30 and the buffer mechanism 70 along the transport path for the flexible substrate 1. The heating process by the drying mechanism 60 plays not only a role of removing volatile components such as organic solvent but also another role of promoting a curing reaction and so forth of the base resin in the adhesive. The drying hood 61 includes a plurality of heaters therein. Although drying conditions such as a heating temperature by the drying mechanism 60 are not restricted particularly, preferably they are determined, for example, in response to the type of the adhesive or the curing temperature.

The buffer mechanism 70 is provided to temporarily increase or decrease the transport distance of the flexible substrate 1 in order to eliminate a difference in transport speed arising from a difference in time required for processes applied to the flexible substrate 1 by the different mechanisms, and includes a movable roll 71. The movable roll 71 is movable between a near position P4 and a far position P3 with respect to the transport path for the belt-like flexible substrate 1 while supporting the belt-like flexible substrate 1 for transportation.

The buffer mechanism 70 may be disposed between two different mechanisms between which a difference in transport speed appears along the transport path for the flexible substrate 1, and the position of the buffer mechanism 70 is not restricted particularly. Here, it is assumed that the time required for the coating process by the coating mechanism 30 is longer than the time required for the lamination process by the lamination mechanism 50. Therefore, the buffer mechanism 70 is disposed between the coating mechanism 30 and the lamination mechanism 50, more particularly between the drying mechanism 60 and the cutting mechanism 40.

The principle of elimination of the speed difference by the buffer mechanism 70 is such as follows. In particular, due to the difference in processing time described above, although the lamination process by the lamination mechanism 50 is completed in short time, the coating process by the coating mechanism 30 requires long time. Consequently, in this state, it cannot be avoided to determine the transport speed of the flexible substrate 1 so as to be equal to the transport speed suitable for the coating process for which a lower speed is required. Therefore, upon lamination, in order to make it possible to temporarily increase the transport speed of the flexible substrate 1 in the transport path following the buffer mechanism 70 with respect to the transport speed preceding to the buffer mechanism 70, the movable roll 71 is moved from the position P3 to the position P4. Consequently, if the take-up speed is made higher than the delivery speed, then the amount of the flexible substrate 1 to be supplied to the lamination mechanism 50 temporarily increases, and consequently, the transport speed of the flexible substrate 1 in the transport path following the buffer mechanism 70 can be increased locally. Thereupon, since the speed of rotation of the feed roll 15 which is the speed adjusting roll is maintained fixedly without depending upon the presence or absence of operation of the buffer mechanism 70, the transport speed of the flexible substrate 1 in the transport path preceding to the buffer mechanism 70 is kept fixed. It is to be noted that, after the lamination process of the lamination mechanism 50 is completed, the movable roll 71 is returned from the position P4 to the position P3 within a period before the lamination process in the next operation cycle is carried out. This operation of the buffer mechanism 70 and so forth is repeated for every lamination.

In order to make it possible to eliminate the speed difference by the buffer mechanism 70, the distance of movement of the movable roll 71, that is, between the distance between the positions P3 and P4, is preferably equal to or longer than the lamination length between the transfer layer 1B and the rigid substrate 2, and more preferably, the former distance is greater than the latter distance.

It is to be noted that, for example, if, different from the case described above, the lamination process by the lamination mechanism 50 requires longer time than the coating process by the coating mechanism 30, then upon lamination, the movable roll 71 may be moved from the position P4 to the position P3. This is because, by a similar principle, the transport speed of the flexible substrate 1 can be temporarily increased in the transport path preceding to the buffer mechanism 70. Naturally, the buffer mechanism 70 need not necessarily be positioned between the coating mechanism 30 and the lamination mechanism 50 as described above but may be disposed between two mechanisms between which a difference in transport speed appears.

The heating mechanism 80 heats (aging) the transfer layer 1B and the rigid substrate 2 laminated to each other with the adhesive interposed therebetween and includes a heating apparatus such as a baking furnace or a hot plate in the inside of the processing chamber. Preferably, the heating mechanism 80 is disposed along the transport path for the rigid substrate 2 in order to make the time after completion of lamination till starting of heating as short as possible. Consequently, the transfer layer 1B and the rigid substrate 2 laminated to each other are transported in line into the heating mechanism 80 rapidly. By the heating process of the heating mechanism 80, such volatile components as organic solvent remaining in the adhesive are removed and the adhesive force of the adhesive is stabilized.

The cleaning mechanism 90 cleans the surface of the rigid substrate 2 before the lamination, that is, the surface to be laminated to the transfer layer 1B and includes a cleaning apparatus in the inside of the processing chamber. The cleaning mechanism 90 is disposed between the preparation room 21 and a position corresponding to the lamination mechanism 50 along the transport path for the rigid substrate 2. Although the cleaning method is not restricted particularly, for example, chemical cleaning or abrasive cleaning is used, and after the cleaning, a rinsing process, a drying process and so forth may be carried out. The chemical cleaning may be, for example, dipping cleaning or shower cleaning using alkaline solution or the like, and the abrasive cleaning may be, for example, tape polishing or dry ice blasting.

The cleaning mechanism 91 cleans the surface of the transfer layer 1B after the lamination, that is, the face of the transfer layer 1B on which a circuit device such as a TFT is to be formed at a succeeding step, and has, for example, a configuration similar to that of the cleaning mechanism 90. The cleaning mechanism 91 is disposed between a position corresponding to the lamination mechanism 50 and the recovery room 22 along the transport path for the rigid substrate 2.

<2. Operation of the Lamination Apparatus>

Now, operation of the lamination apparatus is described. FIGS. 4A to 4E illustrate operation of the lamination apparatus and schematically show a cross sectional configuration of the flexible substrate 1, rigid substrate 2 and components of the lamination apparatus associated with them. It is to be noted that arrow marks Y1 and Y2 in FIGS. 3 to 4E represent directions of movement of a flexible substrate 1 and a rigid substrate 2 individually introduced to the lamination position.

In the lamination apparatus, as seen in FIGS. 1 and 3, the transport mechanism 10 first transports a belt-like flexible substrate 1 such that the transfer layer 1B of the flexible substrate 1 provides an outer face of the flexible substrate 1. In this instance, the flexible substrate 1 is supplied from the delivery roll 11 and taken up by the take-up roll 19. Further, the surface of the transfer layer 1B is cleaned by the cleaning roll 12. Within the front half of the transport process of the flexible substrate 1, the transfer layer 1B is positioned on the upper side with respect to the supporting layer 1A as seen in FIG. 3.

Meanwhile, a rigid substrate 2 placed on the movable member 25 of the transport mechanism 20 is transported from the preparation room 21 toward the recovery room 22 such that the face thereof which is to be laminated to the transfer layer 1B comes to the upper side. In this instance, after the surface of the rigid substrate 2 is cleaned by the cleaning apparatus of the cleaning mechanism 90, the rigid substrate 2 is introduced to the lamination position.

Figure 4A:
FIGS. 4A to 4E are schematic sectional views illustrating operation of the lamination apparatus.

Then, while the belt-like flexible substrate 1 is transported, the coating apparatus 31 of the coating mechanism 30 coats adhesive 3 to the transfer layer 1B as seen in FIG. 4A, and then the drying hood 61 of the drying mechanism 60 heats the adhesive 3 to dry the same. Although the drying conditions are not restricted particularly, for example, the heating temperature=approximately 80° C. to 200° C. and the heating time=approximately ten minutes to one hour.

Figure 4B:
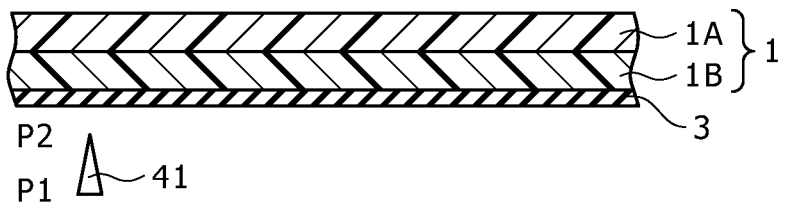

Within the latter half of the transport path for the flexible substrate 1, since the transport direction of the flexible substrate 1 is reversed by the feed rolls 16 and 17, the transfer layer 1B is positioned on the lower side with respect to the supporting layer 1A as seen in FIG. 4B. Consequently, the cutter 41 of the cutting mechanism 40 is opposed to the transfer layer 1B and therefore can cut the transfer layer 1B.

Figure 4C:
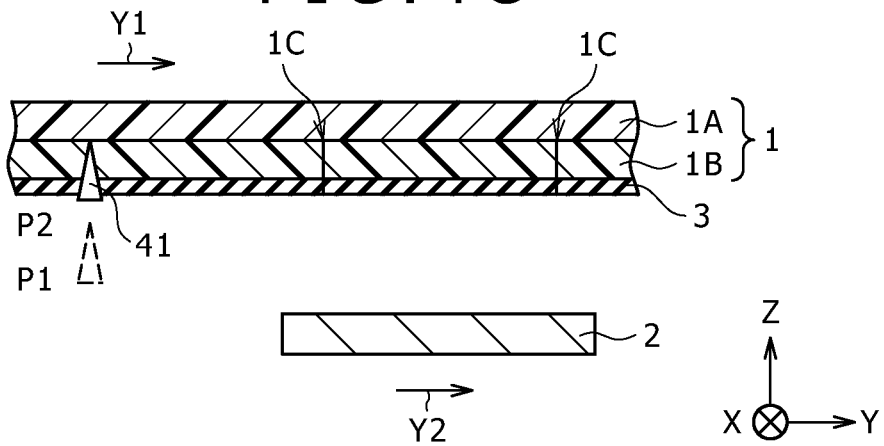

Thereafter, the cutter 41 moves from the position P1 to the position P2 as seen in FIG. 4C to form a cut 1C in the flexible substrate 1 in order to cut only the transfer layer 1B of the flexible substrate 1 at each predetermined distance. Consequently, a portion of the transfer layer 1B defined by adjacent cuts 1C is placed into a state in which it can be peeled off from the supporting layer 1A. Here, for example, the transfer layer 1B is cut over the full width thereof.

Figure 4D:
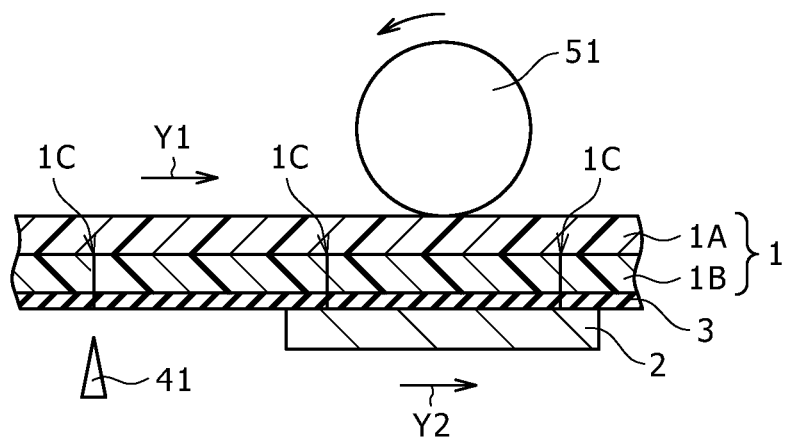
Figure 4E:
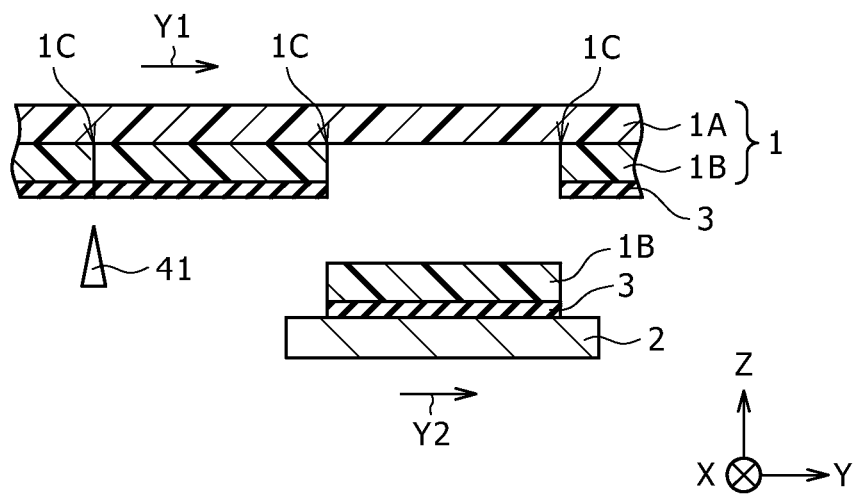

Then, the laminating roll 51 of the lamination mechanism 50 presses the flexible substrate 1 against the rigid substrate 2 as seen in FIG. 4D. Consequently, the portion of the transfer layer 1B defined by the cuts 1C is laminated to the rigid substrate 2 with the adhesive 3 interposed therebetween. Consequently, the transfer layer 1B is transferred to the rigid substrate 2.

Upon such lamination, since the movable roll 71 of the buffer mechanism 70 moves from the position P3 to the position P4 as seen in FIGS. 1 and 2, the difference between the transport speeds of the flexible substrate 1 before and after the buffer mechanism 70 is eliminated.

Thereafter, while the flexible substrate 1 after the lamination is transported toward the take-up roll 19, the rigid substrate 2 after the lamination is transported in a direction different from that toward the take-up roll 19, that is, in a direction toward the recovery room 22. Consequently, the portion of the transfer layer 1B defined by the cuts 1C is peeled off from the supporting layer 1A as seen in FIG. 4E.

Thereafter, the transfer layer 1B and the rigid substrate 2 laminated to each other are transported to the recovery room 22 past the cleaning mechanism 91 and the heating mechanism 80 by the transport mechanism 20. In this instance, the surface of the transfer layer 1B is cleaned first by the cleaning apparatus of the cleaning mechanism 91, and then the transfer layer 1B, adhesive 3 and rigid substrate 2 are heated by the heating apparatus of the heating mechanism 80. Although the heating conditions in this instance are not restricted particularly, they are, for example, a heating temperature=approximately 120° C. to 200° C. and heating time=approximately one hour.

Working Effect of the Lamination Apparatus

In the present lamination apparatus, while the belt-like flexible substrate 1 including the supporting layer 1A and the transfer layer 1B and the sheet-like rigid substrate 2 are transported, the adhesive 3 is coated to the transfer layer 1B and the transfer layer 1B is cut into a sheet, whereafter the cut transfer layer 1B is laminated to the rigid substrate 2. In this instance, by introducing the belt-like flexible substrate 1 and the sheet-like rigid substrate 2 into the single apparatus, a lamination process of the flexible substrate 1 shaped into a sheet and the rigid substrate 2 is carried out continuously in line. Consequently, there is no necessity to prepare a flexible substrate 1 in the form of a sheet in advance, and there is no necessity to use a plurality of apparatus for carrying out a series of processes such as a coating process, a cutting process and a lamination process, either. Further, since a series of processes need not be carried out separately from each other, the time required for the series of processes is shortened, and all processes are completed by the single apparatus. Therefore, the processing efficiency is improved. Consequently, the flexible substrate 1 can be laminated to the rigid substrate 2 efficiently in short time through the adhesive 3. Further, also it is possible to miniaturize the apparatus to reduce the occupying area of the apparatus.

Particularly, if the difference in transport speed of the flexible substrate 1 is eliminated by the buffer mechanism 70, then it is possible to continuously carry out a plurality of processes, whose processing time periods are different from each other, in-line while continuously transporting the flexible substrate 1.

Further, if the transfer layer 1B laminated to the rigid substrate 2 with the adhesive 3 interposed therebetween is introduced in line into the heating mechanism 80, then absorption of moisture in the atmospheric air into the adhesive 3 is suppressed. Therefore, coming off of the transfer layer 1B arising from deterioration of the adhesive force of the adhesive 3 and so forth can be prevented.

Further, if the cleaning mechanism 90 cleans the surface of the rigid substrate 2 before the lamination, then mixture of foreign articles into the interface of the lamination and so forth can be prevented. Further, if the cleaning mechanism 91 cleans the surface of the transfer layer 1B after the lamination, then sticking of foreign articles to the surface of the transfer layer 1B on which a circuit device such as a TFT is formed at a succeeding step and so forth can be prevented.

While a preferred embodiment of the disclosed technology has been described using specific terms, the disclosed technology is not limited to the mode described in the description of the embodiment but can be carried out in various modified forms. For example, the lamination apparatus of the present technology may be applied not to such a circuit board as described above but to any other application only if it can utilize a flexible substrate laminated to a rigid substrate through adhesive.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A lamination apparatus, comprising:
    a first transport mechanism configured to transport a belt-like flexible substrate including a transfer layer and a supporting layer layered on each other;
    a second transport mechanism configured to transport a sheet-like rigid substrate;
    a coating mechanism configured to coat adhesive to the transfer layer while transporting the belt-like flexible substrate;
    a cutting mechanism configured to cut the transfer layer having the adhesive coated thereon into a sheet while transporting the belt-like flexible substrate with the supporting layer uncut;
    a lamination mechanism configured to laminate the transfer layer cut out into the sheet to the sheet-like rigid substrate through the adhesive while transporting the belt-like flexible substrate and the sheet-like rigid substrate; and
    a buffer mechanism, positioned between the coating mechanism and the lamination mechanism, configured to move between a far position and a near position with respect to a transport path for the belt-like flexible substrate while supporting the belt-like flexible substrate for transportation.

2. The lamination apparatus according to claim 1, further comprising a mechanism configured to heat the transfer layer laminated to the sheet-like rigid substrate through the adhesive.

3. The lamination apparatus according to claim 1, wherein the belt-like flexible substrate is a plastic film and the sheet-like rigid substrate is a glass plate.

4. The lamination apparatus according to claim 1, wherein the sheet-like rigid substrate is transported in the form of a plurality of flat plates separated from each other.

* * * * *